(12) United States Patent　　(10) Patent No.: US 8,670,804 B2
Piilila et al.　　(45) Date of Patent: *Mar. 11, 2014

(54) COMPUTER PROGRAM PRODUCTS, APPARATUSES AND METHODS FOR ASSOCIATING AND DISPLAYING MESSAGES IN MOBILE TERMINALS

(71) Applicant: Nokia Corporation, Espoo (FI)

(72) Inventors: Katja Piilila, Pirkkala (FI); Julia Makinen, Lempaaia (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,442

(22) Filed: Mar. 1, 2013

(65) Prior Publication Data

US 2013/0181970 A1　　Jul. 18, 2013

Related U.S. Application Data

(63) Continuation of application No. 11/617,937, filed on Dec. 29, 2006, now Pat. No. 8,538,483.

(51) Int. Cl.
*H04M 3/00* (2006.01)
*G06F 3/048* (2013.01)
*G06F 17/00* (2006.01)

(52) U.S. Cl.
USPC ............ 455/566; 455/418; 715/273; 715/764

(58) Field of Classification Search
USPC ........ 709/206, 203; 455/412.1, 418; 707/798; 715/273, 764, 716; 704/7
See application file for complete search history.

(56) References Cited

U.S. PATENT DOCUMENTS

| | | | |
|---|---|---|---|
| 6,052,121 A * | 4/2000 | Webster et al. | 715/733 |
| 6,587,033 B1 | 7/2003 | Morishima | |
| 2002/0087628 A1 | 7/2002 | Rouse et al. | |
| 2002/0103867 A1 * | 8/2002 | Schilter | 709/206 |
| 2002/0169840 A1 | 11/2002 | Sheldon et al. | |
| 2003/0064707 A1 | 4/2003 | Yoneyama | |
| 2003/0135572 A1 | 7/2003 | Katada | |
| 2006/0005128 A1 * | 1/2006 | Haug et al. | 715/530 |

OTHER PUBLICATIONS

International Search Report for International Application No. PCT/IB2007/004028, mailed Jul. 11, 2008.
Microsoft Outlook 2000 SP-3.

* cited by examiner

*Primary Examiner* — Nizar Sivji
(74) *Attorney, Agent, or Firm* — Alston & Bird LLP (57) ABSTRACT

Apparatuses for associating and displaying messages and contacts in a way that allows users to access either category of information is provided. One apparatus includes a processing element that associates the messages with corresponding contacts and also includes a memory element configured to store contacts and messages received or transmitted. The apparatus may also include a display such that the processing element may generate upon the display a visual representation of the contacts and messages. Messages are associated with corresponding contacts and are displayed according to the associations. For example, a message may be associated with a contact based on a common identifier of the contact and the message. Messages associated with a selected contact may be displayed, and contacts associated with messages that have been received or sent may also be displayed according to user inputs. Methods and computer program products are also provided.

16 Claims, 8 Drawing Sheets

COMPUTER PROGRAM PRODUCTS, APPARATUSES AND METHODS FOR ASSOCIATING AND DISPLAYING MESSAGES IN MOBILE TERMINALS

CROSS-REFERENCE TO RELATED APPLICATIONS

This application is a continuation of U.S. non-provisional patent application Ser. No. 11/617,937, now U.S. Pat. No. 8,538,483, filed on Dec. 29, 2006, for "Computer Program Products, Apparatuses and Methods for Associating and Displaying Messages in Mobile Terminals," the contents of each of which are incorporated herein by reference in their entirety.

TECHNOLOGICAL FIELD

Embodiments of the present invention relate generally to mobile communications technology and, more particularly, to the association of messages and contacts in mobile terminals.

BACKGROUND

The current age has been termed by some the "Communications Age"—a time when people are focused on sharing information effectively. Geographic boundaries and physical distances are becoming less significant as people find new ways to communicate and share information with each other.

As communication increases, the amount of knowledge and information transferred between communicants also increases. Unable to remember all of this information on their own, people often rely on devices, such as mobile terminals, to provide storage of and access to information. Even with the help of external devices, however, proper organization of the information is important for allowing a person, such as the user of a mobile terminal, to find a required item of information quickly and conveniently.

In an effort to organize information, mobile terminals today generally use multiple applications for storing and providing access to certain types of information. For example, a user's contacts, or people with whom the user may communicate, may be stored in one application, and the user's messages, or the information/communication exchanged between the user and another, may be stored in another application. Such an arrangement typically requires the user to access a Contacts application to obtain information associated with the user's contacts, such as telephone numbers and e-mail addresses. A user may also compose a message to one of the user's contact from within the Contacts application. However, in order to view a message, for example a message that has been received by the user, the user must access a different application, such as a Messaging application, to view or review the message.

A user may be able to create a folder or other organizational structure within the Messaging application in which to store certain messages sent and received. For example, the user may create a folder in which he may store and access all messages sent to or received from a particular person. However, the user would still not be able to access information other than the stored messages from the Messaging application.

Thus, there is a need for associating and displaying messages and contacts in a way that allows users to access either category of information more quickly and conveniently.

BRIEF SUMMARY

Apparatuses, methods, and computer program products are therefore provided for associating and displaying messages and contacts. Thus, the users of mobile terminals may access and view contact information and associated messages from a single application.

In one exemplary embodiment, an apparatus for associating messages with corresponding contacts is provided. The apparatus comprises a memory element configured to store a plurality of contacts and messages received or transmitted by the apparatus and a processing element configured to associate at least some of the messages with corresponding contacts. The messages may include an audio message, a text message, an instant text message, or a multimedia message.

In some embodiments, each contact includes at least one identifier such as a first name, a last name, a home phone number, a work phone number, a fax number, and/or an e-mail address. The processor may be configured to associate a message and a contact if both the message and the contact include a common identifier.

The apparatus may further comprise a display. The processing element may be responsive to a user input selecting one of the contacts and may be configured to generate an image on the display that visually represents the at least one identifier of the contact selected. Furthermore, the processing element may be configured to generate an image on the display that visually represents the messages associated with each contact. The processing element may also be configured to associate messages transmitted to a plurality of recipients with each contact that includes an identifier that corresponds to any of the recipients. In some embodiments, the processing element may be configured to associate messages that are not associated with a corresponding contact with other messages that are not associated with any corresponding contact.

In another embodiment, the apparatus includes a display and a processing element configured to drive the display to present an image that includes a visual representation of a plurality of contacts and messages, with at least some of the messages being displayed in association with a corresponding contact.

In some embodiments, each contact includes at least one identifier. The processing element may be configured to drive the display to present an image that includes a visual representation of the at least one identifier based on an input received selecting the contact. The processing element may also be configured to drive the display to present an image that includes a visual representation of the messages received from or sent to a particular contact based on an input received selecting the contact.

The processing element may be configured to drive the display to present an image that includes a visual representation of one of the messages based on an input received selecting the message. The processing element may also be configured to drive the display to present an image that includes a visual representation of the contacts from which messages were received over a predefined time period and/or to which messages were sent over a predefined time period. Furthermore, the processing element may be configured to drive the display to present an image that includes a visual representation of the messages that are not associated with any corresponding contact.

In another exemplary embodiment, a method for associating messages with corresponding contacts is provided. The method includes accessing a plurality of contacts and messages that have been transmitted or received and associating at least some of the messages with corresponding contacts. Each contact may include at least one identifier, and a message and a contact may be associated if both the message and the contact include a common identifier. The method may further include storing the at least one identifier of each contact and displaying an image that visually represents at least one of the identifiers or the messages associated with each contact. In some embodiments, messages transmitted to a plurality of recipients may be associated with each contact that includes an identifier that corresponds to any of the recipients.

In another exemplary embodiment, a method for displaying messages associated with corresponding contacts is provided. The method includes accessing a plurality of contacts and messages that have been transmitted or received and displaying an image that includes a visual representation of a plurality of contacts and messages with at least some of the messages being displayed in association with a corresponding contact. Each contact may include at least one identifier, and an image may be displayed that includes a visual representation of the at least one identifier.

In some embodiments, the messages received from or sent to a particular contact may be displayed. The contacts from which messages were received and/or to which messages were sent over a predefined time period may also be displayed. Furthermore, messages that are not associated with any corresponding contact may also be displayed.

In another exemplary embodiment, a computer program product for associating messages with corresponding contacts is provided that is configured to perform any of the foregoing methods. The computer program product includes at least one computer-readable storage medium having computer-readable program code portions stored therein. The computer-readable program code portions include a plurality of executable portions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

Figure 1:
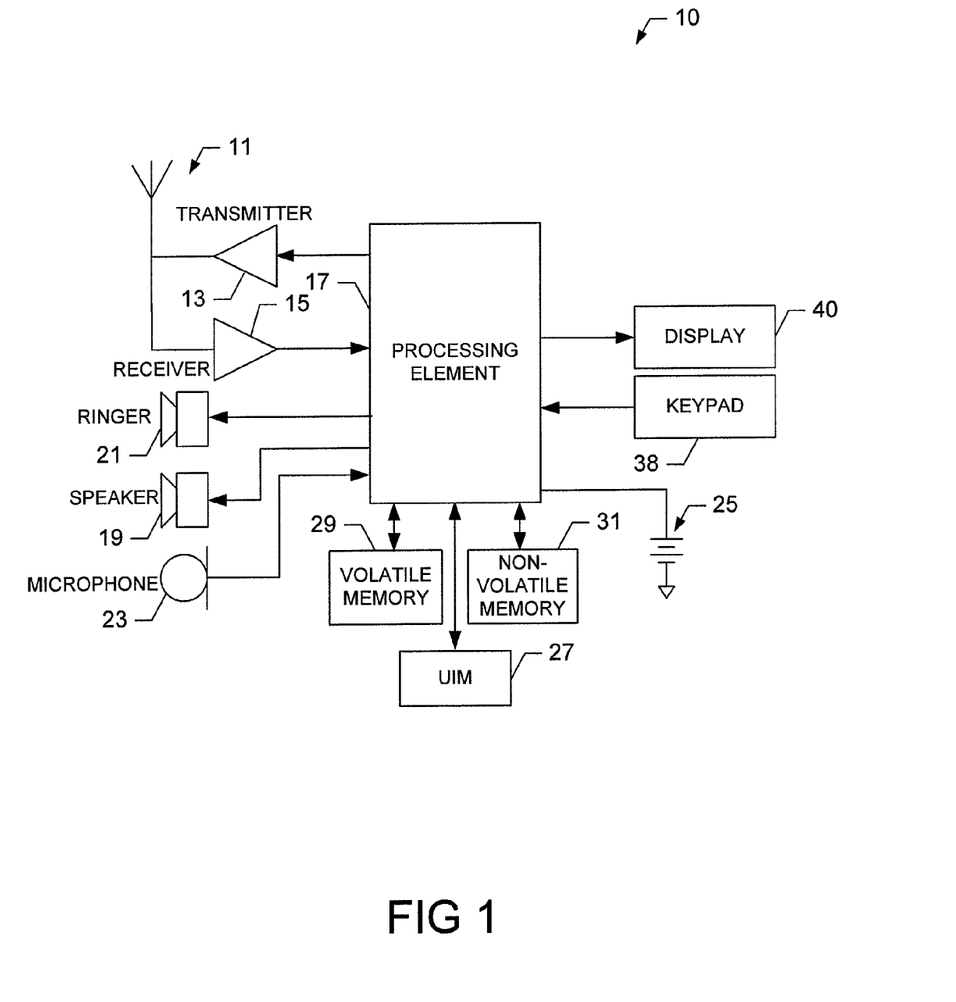
FIG. 1 is a schematic representation of an apparatus according to an exemplary embodiment of the present invention

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 11 (or multiple antennae) in operable communication with a transmitter 13 and a receiver 15. The mobile terminal 10 further includes means, such as a controller or other processing element 17, for providing signals to and receives signals from the transmitter 13 and receiver 15, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols or the like.

It is understood that the processing element 17 includes circuitry desirable for implementing audio and logic functions of the mobile terminal 10. For example, the processing element 17 may be comprised of a digital signal processor device, a microprocessor device, and various analog to digital converters, digital to analog converters, and other support circuits. Control and signal processing functions of the mobile terminal 10 are allocated between these devices according to their respective capabilities. The processing element 17 thus may also include the functionality to convolutionally encode and interleave message and data prior to modulation and transmission. The processing element 17 can additionally include an internal voice coder, and may include an internal data modem. Further, the processing element 17 may include functionality to operate one or more software programs, which may be stored in memory. For example, the processing element 17 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 19, a ringer 21, a microphone 23, means, such as a display 40, for displaying images, and a user input interface, all of which are coupled to the processing element 17. The user input interface, which allows the mobile terminal 10 to receive data, may include any of a number of devices allowing the mobile terminal 10 to receive data, such as a keypad 38, a touch display (not shown) or other input device. In embodiments including the keypad 38, the keypad 38 may include the conventional numeric (0-9) and related keys (#, *), and other keys used for operating the mobile terminal 10. Alternatively, the keypad 38 may include a conventional QWERTY keypad arrangement. The keypad 38 may also include various soft keys with associated functions. In addition, or alternatively, the mobile terminal 10 may include an interface device such as a joystick or other user input interface. The mobile terminal 10 further includes a battery 25, such as a vibrating battery pack, for powering various circuits that are required to operate the mobile terminal 10, as well as optionally providing mechanical vibration as a detectable output.

The mobile terminal 10 may further include a user identity module (UIM) 27. The UIM 27 is typically a memory device having a processor built in. The UIM 27 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 27, the mobile terminal 10 may be equipped with other means, such as memory, for storing information. For example, the mobile terminal 10 may include volatile memory 29, such as volatile Random Access Memory (RAM) including a cache area for the temporary storage of data. The mobile terminal 10 may also include other non-volatile memory 31, which can be embedded and/or may be removable. The non-volatile memory 31 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
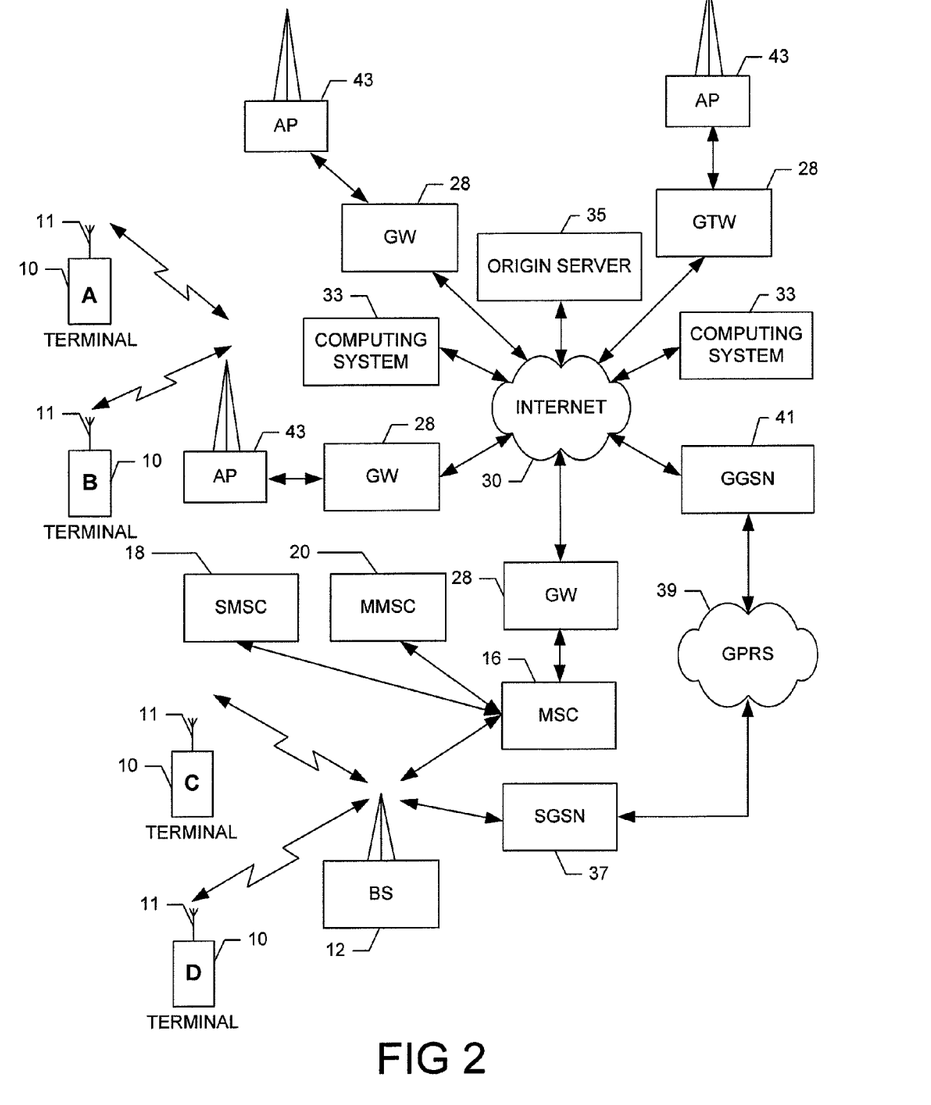
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 11 for transmitting signals to and for receiving signals from a base site or base station (BS) 12. The base station 12 may be a part of one or more cellular or mobile networks each of which includes elements required to operate the network, such as a mobile switching center (MSC) 16. As well known to those skilled in the art, the mobile network may also be referred to as a Base Station/MSC/Interworking function (BMI). In operation, the MSC 16 is capable of routing calls to and from the mobile terminal 10 when the mobile terminal 10 is making and receiving calls. The MSC 16 can also provide a connection to landline trunks when the mobile terminal 10 is involved in a call. In addition, the MSC 16 can be capable of controlling the forwarding of messages to and from the mobile terminal 10, and can also control the forwarding of messages for the mobile terminal 10 to and from a messaging center, such as a short messaging service center (SMSC) 18 or a multimedia messaging service center (MMSC) 20. It should be noted that although the MSC 16 is shown in the system of FIG. 2, the MSC 16 is merely an exemplary network device and embodiments of the present invention are not limited to use in a network employing an MSC.

The short messaging service center (SMSC) 18 is generally configured to facilitate the transmission of short text messages to and from mobile terminals 10 that are capable of sending such text messages. The SMSC 18 may, for example receive a short text message from one mobile terminal and transmit it to another mobile terminal designated as the intended recipient. Similarly, the multimedia messaging service center (MMSC) 20 may be configured to send and receive multimedia objects, such as images, audio, video, and rich text, between mobile terminals 10.

The MSC 16 can be coupled to a data network, such as a local area network (LAN), a metropolitan area network (MAN), and/or a wide area network (WAN). The MSC 16 can be directly coupled to the data network. In one typical embodiment, however, the MSC 16 is coupled to a gateway device (GTW) 28, and the GTW 28 is coupled to a WAN, such as the Internet 30. In turn, devices such as processing elements (e.g., personal computers, server computers or the like) can be coupled to the mobile terminal 10 via the Internet 30. For example, as explained below, the processing elements can include one or more processing elements associated with a computing system 33 (two shown in FIG. 2), origin server 35 (one shown in FIG. 2) or the like, as described below.

The BS 12 can also be coupled to a serving GPRS (General Packet Radio Service) support node (SGSN) 37. As known to those skilled in the art, the SGSN 37 is typically capable of performing functions similar to the MSC 16 for packet switched services. The SGSN 37, like the MSC 16, can be coupled to a data network, such as the Internet 30. The SGSN 37 can be directly coupled to the data network. In a more typical embodiment, however, the SGSN 37 is coupled to a packet-switched core network, such as a GPRS core network 39. The packet-switched core network is then coupled to another GTW 28, such as a gateway GPRS support node (GGSN) 41, and the GGSN 41 is coupled to the Internet 30. In addition to the GGSN 41, the packet-switched core network can also be coupled to a GTW 28. Also, the GGSN 41 can be coupled to a messaging center. In this regard, the GGSN 41 and the SGSN 37, like the MSC 16, may be capable of controlling the forwarding of messages, such as MMS messages. The GGSN 41 and SGSN 37 may also be capable of controlling the forwarding of messages for the mobile terminal 10 to and from the messaging center.

In addition, by coupling the SGSN 37 to the GPRS core network 39 and the GGSN 41, devices such as a computing system 33 and/or origin server 35 may be coupled to the mobile terminal 10 via the Internet 30, SGSN 37 and GGSN 41. In this regard, devices such as the computing system 33 and/or origin server 35 may communicate with the mobile terminal 10 across the SGSN 37, GPRS core network 39 and the GGSN 41. By directly or indirectly connecting mobile terminals 10 and the other devices (e.g., computing system 33, origin server 35, etc.) to the Internet 30, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 12. In this regard, the network(s) may be capable of supporting communication in accordance with any one or more of a number of first generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 43. The APs 43 may comprise access points configured to communicate with the mobile terminal 10 in accordance with techniques such as, for example, radio frequency (RF), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or wireless Personal Area Network (WPAN) techniques such as IEEE 802.15, BlueTooth (BT), ultra wideband (UWB) and/or the like. The APs 43 may be coupled to the Internet 30. Like with the MSC 16, the APs 43 can be directly coupled to the Internet 30. In one embodiment, however, the APs 43 are indirectly coupled to the Internet 30 via a GTW 28. Furthermore, in one embodiment, the BS 12 may be considered as another AP 43. As will be appreciated, by directly or indirectly connecting the mobile terminals 10 and the computing system 33, the origin server 35, and/or any of a number of other devices, to the Internet 30, the mobile terminals 10 can communicate with one another, the computing system, etc., to thereby carry out various functions of the mobile terminals 10, such as to transmit data, content or the like to, and/or receive content, data or the like from, the computing system 33. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 33 across the Internet 30, the mobile terminal 10 and computing system 33 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 33 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 33, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1 and a network device of the system of FIG. 2 in order to execute applications for establishing communication between the mobile terminal 10 and other mobile terminals, for example, via the system of FIG. 2. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a network device or other device accessible to the communication device.

Referring again to FIG. 1, the memory element 29 of the mobile terminal 10 is configured to store one or more contacts and messages received or transmitted by the mobile terminal 10, while the processing element 17 is configured to associate at least some of the messages with corresponding contacts. It should be understood that any of the memory elements shown in FIG. 1 and previously described may be configured to store contacts and messages; however, for ease of explanation, the discussion will focus on volatile memory as the memory element 29. A contact may be, for example, a data record associated with a particular individual or other entity that generally includes identifiers for enabling the establishment of communication with the particular individual or other entity. Contacts may include, for example, one or more identifiers, such as a first name, a last name, a home phone number, a work phone number, a fax number, or an e-mail address. The identifiers of each contact may be manually entered or may be received by the mobile terminal 10 from an external source, such as another mobile terminal 10, and stored automatically. For example, one or more identifiers for a particular contact may be entered via a user input device, such as a keypad 38. Similarly, a message sent or received by a mobile terminal 10 may include one or more identifiers. The memory element 29 may be configured to store the contact information and the messages.

Referring to FIG. 2, for example, a mobile terminal 10 may be able to send a message to a recipient or receive a message from a sender. The recipient/sender may be another mobile terminal 10 or any other communication device capable of receiving or sending messages, such as a landline telephone or computer. For example, a mobile terminal A may send a message to another mobile terminal B. The message may be, for example, an audio message (such as a voice message), a text message, an instant text message, or a multimedia message (such as a video or picture message). In other words, the message may be any message supported by the mobile terminal, including smart messages, Infrared Data Association (IrDA) communications, and BT messages.

Continuing the previous example, the recipient of the message (B) may have A included as one of B's contacts. For instance, identifiers corresponding to A, such as A's first and last name, his home and work phone numbers, and his e-mail address, may be included in a contact entry listing A as a contact on B's mobile terminal. At the same time, the messages exchanged by the mobile terminal 10 may also include identifiers. For example, the message received by B may include A's telephone number or other identifiers to identify A as the sender of the message. The message, for example, may comprise a header and/or footer listing the one or more identifiers and other information about the transmission of the message from A to B (such as a date and time of transmission), as well as a body portion containing the communication itself (e.g., the text of a text message).

The processing element 17 may be configured to associate a message and a contact if both the message and the contact include a common identifier. For instance, in the example above, the processing element 17 of B's mobile terminal may read the header or other part of the message received (that was sent by A) and find an identifier consisting of A's telephone number. The processing element 17 may also look to the contact information and find a contact including A's telephone number as an identifier. In this case, both the message from A and the contact information listed under the entry for A would include a common identifier—A's telephone number. Thus, according to this embodiment, the processing element 17 would associate the message from A with the contact information listed for A.

In this way, a user B may be able to view the messages sent to or received from A by accessing the contact entry for A, as will be described below. In addition, the processing element 17 may be configured to associate messages that are not associated with a corresponding contact with other messages that are not associated with any corresponding contact. For example, B may receive a message from C, with whom B has had no prior dealings. The processing element 17 may attempt to associate the message from C with a contact for C; however, because B has never dealt with C before, no such contact may exist. B may also have received a message from D, who is also not listed as one of B's contacts. In this case, the processing element 17 may associate the message from C with a message from D, for example listing both messages in a folder entitled "Miscellaneous" or "Inbox." Furthermore, a message received from or sent to someone who is not a contact may cause a new contact to be generated by the processing element 17, either automatically or as a result of a user input requesting the new contact. The message may then be associated with the newly-created contact.

On the other hand, if a user sends a message to multiple recipients and some of those recipients are included in the user's contacts, the processing element 17 may be configured to associate the message with each contact that includes an identifier that corresponds to any of the recipients. For example, A may have B, C, and D listed in his contacts, and A may send all three of them the same message at the same time. The processing element 17 of this embodiment may be configured to associate the message sent by A with each contact B, C, and D, for example such that A may find a copy of the message with the contact information listed for B, a copy with the contact information listed for C, and so on.

The mobile terminal 10 may also include a display 40, shown in FIG. 1. The display may be a liquid crystal display (LCD), for example, and it may be a color display or black and white. The processing element 17 may be responsive to a user input selecting one of the identifiers and may be configured to generate an image on the display that visually represents data associated with the identifier selected. For example, a user B may manipulate the user input device 38 to find a particular contact by touching the keys of a keypad to scroll down through a list of last names of stored contacts. B in this example may locate the last name sought and push a "select" button, providing an input to the processing element 17 to show the contact selected, including any identifiers of the selected contact. For example, B's selection of A's last name may bring up on the display 40 A's first name, his phone numbers, and other information associated with the contact entry for A. In addition, the processing element 17 may allow the user B to edit any of the displayed information and to compose a message having A as the designated recipient.

Figure 3:
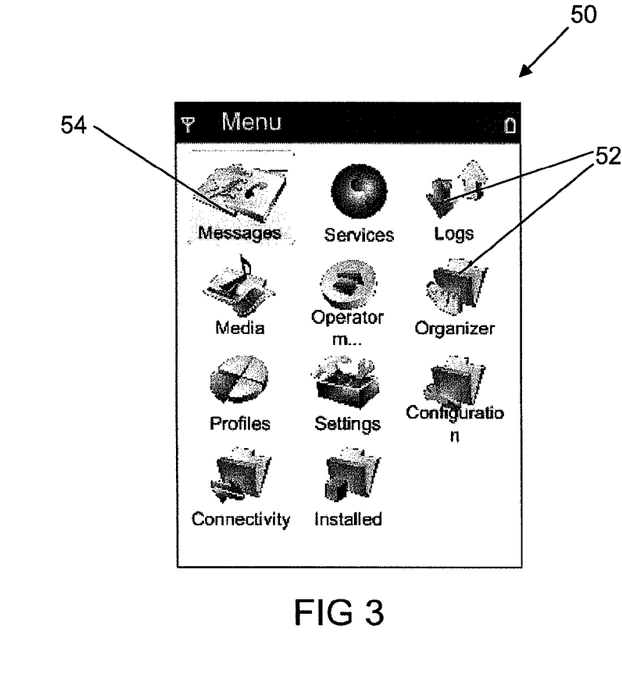
FIG. 3 shows an example of an image generated by execution of a computer program product in accordance with one embodiment.

In another embodiment, the mobile terminal 10 comprises a display 40 and a processing element 17 configured to drive the display to present an image that includes a visual representation of one or more contacts and messages with at least some of the messages being displayed in association with a corresponding contact. Referring to FIG. 3, for example, an image 50 of various applications 52 may be shown on the display 40 (shown in FIG. 1). A user may select one of the applications to use by pressing a button on a keypad of the mobile terminal 10 or otherwise interacting with a keypad 38, such as shown in FIG. 1. Turning back to FIG. 3, one of the applications 52 may be a Messages application 54, where associated messages and contacts may be organized and accessed.

Figure 4:
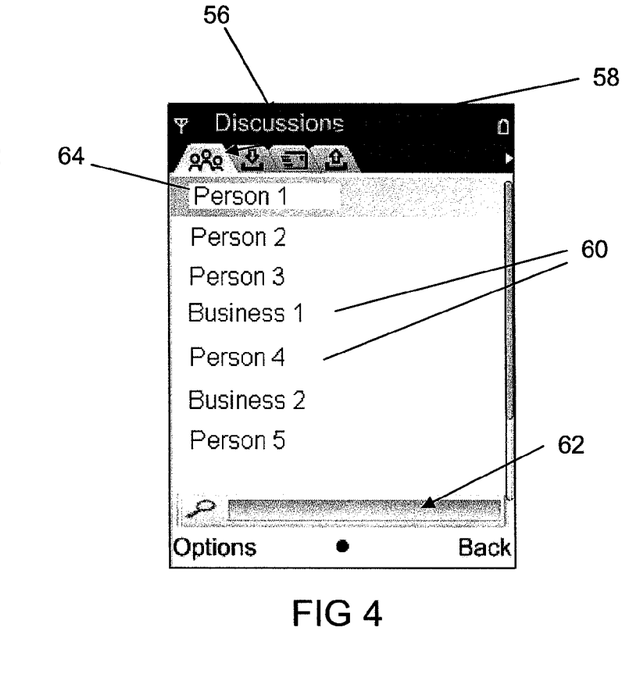
FIG. 4 shows an example of an image generated by execution of a computer program product in accordance with one embodiment.

A user selecting the Messages application 54 may be presented with a screen similar to that shown in FIG. 4. The top of the screen may include a title 56 describing the folder or subfolder accessed to facilitate navigation through the application. Under the title 56 may be one or more tabs 58 through which other information may be accessed. In an exemplary embodiment, there may be tabs 58 for Discussions, Received Messages, Sent Messages, and Outgoing Messages. Selecting the Messages application 54 may provide access to the first tab for Discussions, as shown in FIG. 4. Thus, in FIG. 4 the title 56 is shown as Discussions. Under the Discussions tab may be a summary of the various contact entries 60 stored and accessible on the mobile terminal 10. If there are more entries 60 than can be displayed at once, a text field 62 may receive input from a user, such as the first three letters of the last name of an entry, to find the entry sought. The user may select an entry, via the user input device as previously discussed, to view more information associated with the selected entry 64. Furthermore, messages that are not associated with any of the contacts 60 may be associated with other unassociated messages and may be accessible under a generic contact listing provided with the other contacts 60, such as a generic contact entitled "Inbox" or "Miscellaneous" (not shown).

Figure 5:
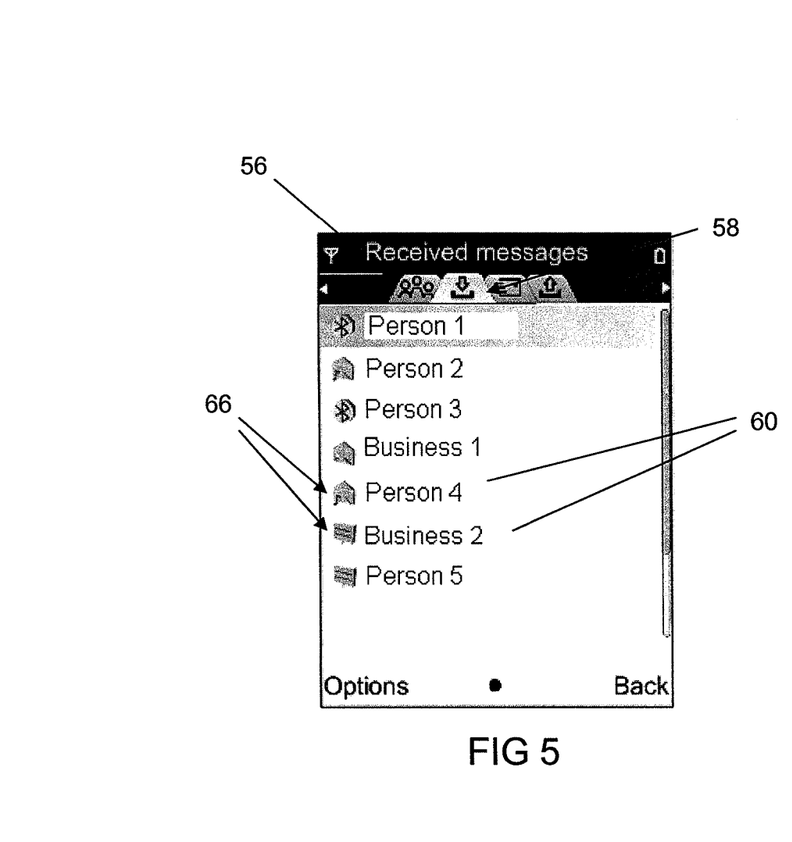
FIG. 5 shows an example of an image generated by execution of a computer program product in accordance with one embodiment.
Figure 6:
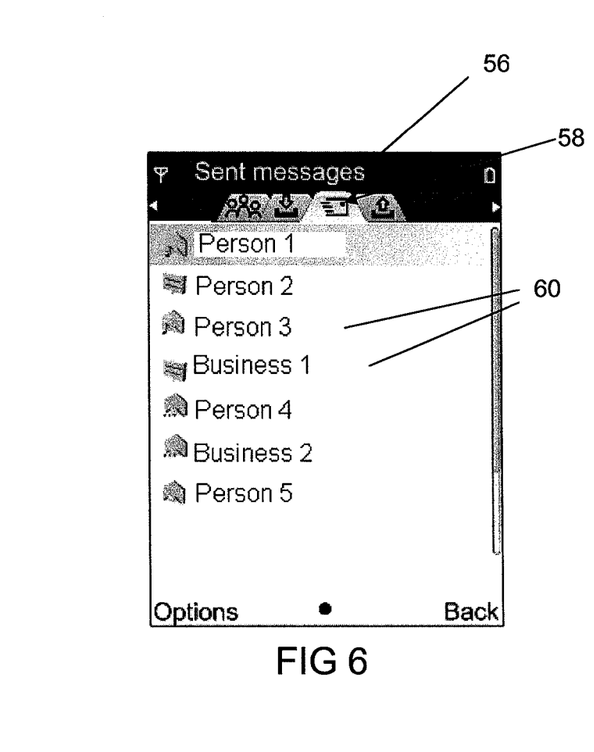
FIG. 6 shows an example of an image generated by execution of a computer program product in accordance with one embodiment.

The second tab 58 of an exemplary embodiment may be for Received Messages, as described in the title 56 shown in FIG. 5. Under this tab, a list of the various contacts 60 from whom messages were received may be displayed. For example, received messages may be presented in the order in which they were received, such that the most recent message is at the top of the list. An indication of the type of message (e.g., text or voice) and/or the status of the message (e.g., read or unread) may also be displayed in the form of a descriptive icon 66 next to each contact 60. For example, an unread text message may be indicated by an unopened envelope icon, or a picture message may be indicated by a camera icon. Similarly, a third tab 58 may show the various contacts 60 to whom messages were sent, as illustrated in FIG. 6.

Figure 7:
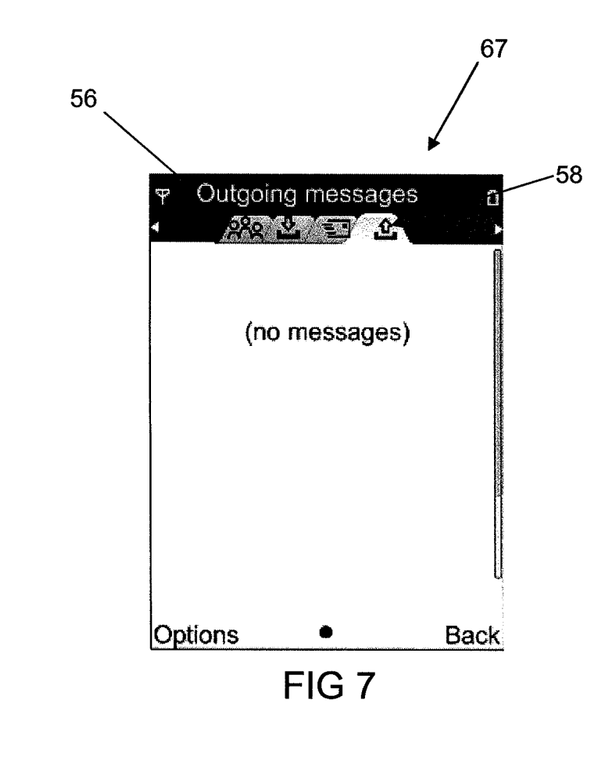
FIG. 7 shows an example of an image generated by execution of a computer program product in accordance with one embodiment.

A fourth tab 58, shown in FIG. 7, may be for Outgoing Messages and may display the contacts 60 associated with any messages that have been drafted but not yet sent. For example, a message that is in the process of being drafted or is waiting to be sent may be accessed, manipulated, and modified from this tab. As a further example, if the mobile terminal 10 is "out of network," messages may be stored here until they can be sent (i.e., until the mobile terminal is "in network" again). If no messages are waiting to be sent, the screen 67 may display the words "No messages," as shown in FIG. 7.

Figure 8:
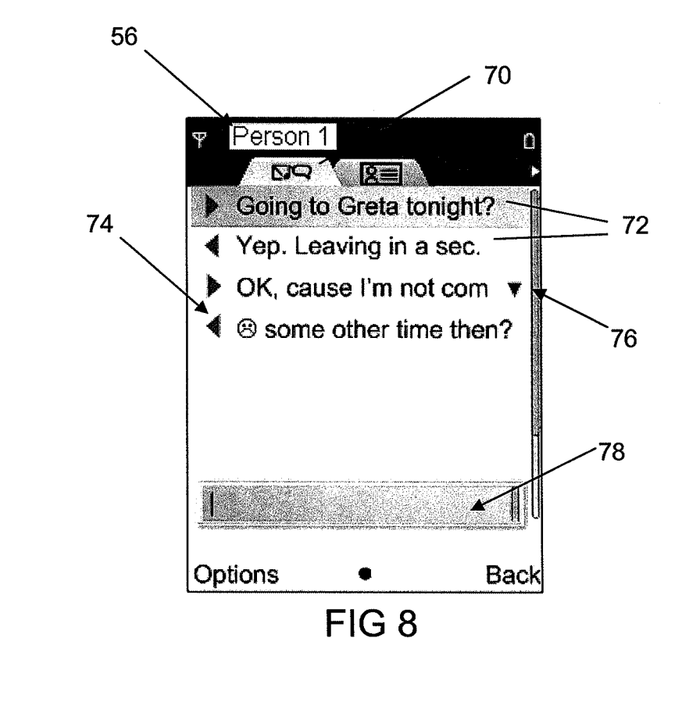
FIG. 8 shows an example of an image generated by execution of a computer program product in accordance with one embodiment.

Referring back to FIG. 4, the selection of a particular contact 64 may display more information associated with the contact 60. For example, the selection of a particular contact 64, such as Person 1, may display a screen as illustrated in FIG. 8. A first sub-tab 70 under the Discussions tab, shown in FIG. 8, may display a list of messages 72 associated with the contact 60. The messages 72 displayed may include messages that were sent to the selected contact 64 as well as messages received from the selected contact 64. An indication 74 of the type of message (e.g., sent or received) may be included, for example in the form of an arrow pointing to the right for sent messages and to the left for received messages. Furthermore, the arrows may be different colors to indicate sent or received messages. Only a certain number of messages may displayed. For example, messages sent or received over the last week, or only the most recent twenty messages, may be displayed.

Figure 9:
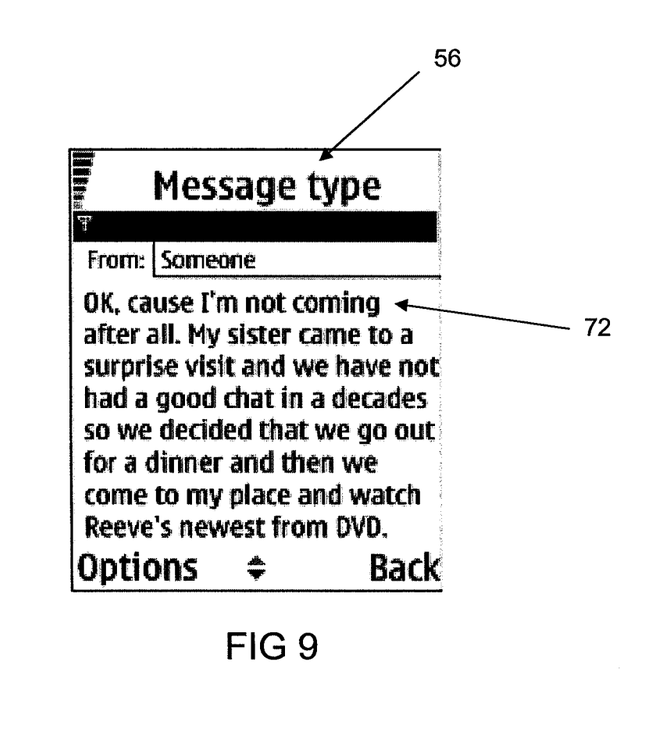
FIG. 9 shows an example of an image generated by execution of a computer program product in accordance with one embodiment.

The messages 72 may be presented by displaying only the first few words of the message, or some other description of the content of the message. For example, if the message is a text message, the first five words of the message may be displayed. Messages 72 longer than the words fitting on the summary screen may be indicated by another icon 76, which may be selected to display the entire contents of the message 72, shown in FIG. 9. In addition, a message may be composed to the particular contact 64 via a text field 78, facilitating the transmission and receipt of instant text messages, for example. The entire message is displayed in FIG. 9.

Figure 10:
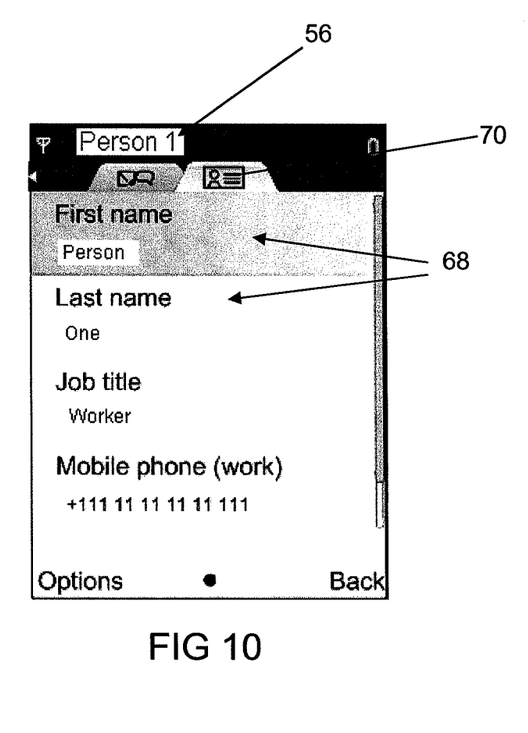
FIG. 10 shows an example of an image generated by execution of a computer program product in accordance with one embodiment.

A second sub-tab 70 under Discussions may display a screen as shown in FIG. 10. For instance, a contact 60 may include one or more identifiers 68, as previously described, which may be displayed and accessed under a second sub-tab 70 under the Discussions tab 58 (shown in FIG. 4)

Figure 11:
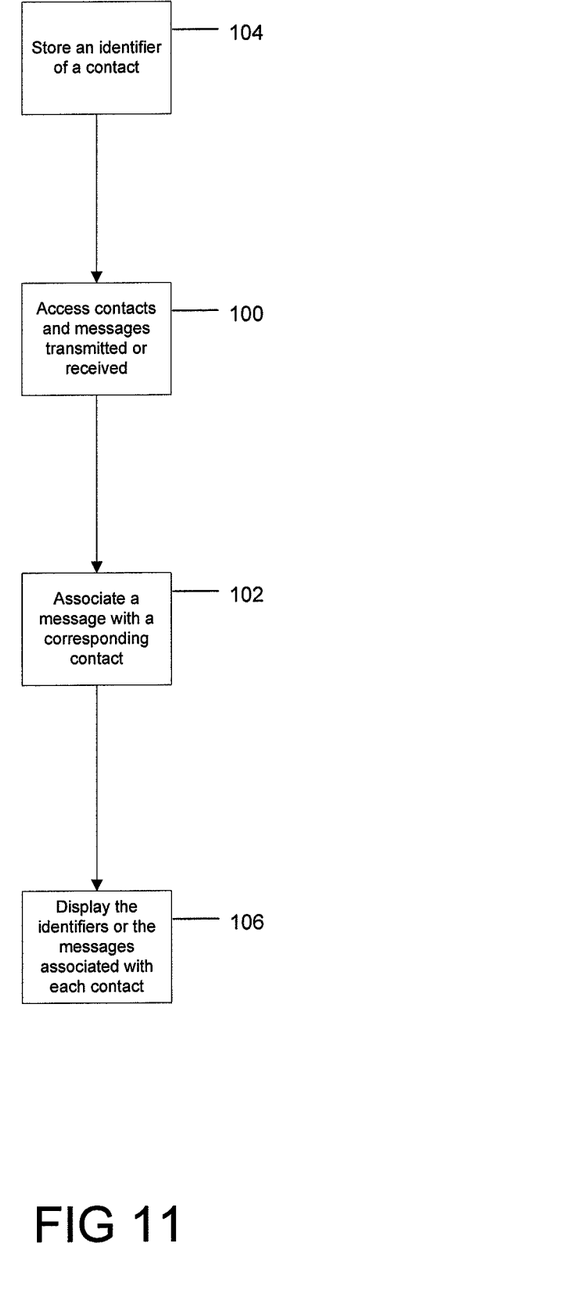
FIG. 11 illustrates a flowchart according to an exemplary method for associating messages with corresponding contacts according to one embodiment of the present invention.

In other embodiments, a method for associating messages and contacts is provided. Referring to FIG. 11, a plurality of contacts and messages that have been transmitted or received by a mobile terminal are accessed. At least some of the messages are then associated with the corresponding contacts. See FIG. 11, blocks 100-102. For example, the contacts stored in a memory element of a mobile terminal may be accessed upon the receipt of a new message by the mobile terminal. Each contact may include one or more identifiers, as previously described. In this example, the newly received message may also contain one or more identifiers, and thus the message may be associated with a corresponding contact if both the message and the corresponding contact include a common identifier. For example, a message sent by Person A may be associated with a contact containing information on Person A.

Furthermore, messages transmitted to more than one recipient may be associated with each contact that includes an identifier that corresponds to any of the recipients. For example, a message sent by Person A to Persons B, C, D, and E may be associated with contacts for Persons B, C, D, and E. If Person A only has contacts relating to Persons C and E, then the message would be associated with the contacts for Persons C and E.

In addition, one or more identifiers of a contact may be stored, as shown in FIG. 11, block 104. For example, a user may provide a first name, last name, and telephone number as identifiers for Person F, and a memory element of a mobile terminal may store these identifiers for future access and/or association. Although storage of an identifier is shown as occurring before the other steps illustrated in FIG. 11, one or more identifiers may be stored at any point and may be stored simultaneously with the performance of other functions.

A visual representation of one or more of the identifiers of a contact or the messages associated with each contact, or a combination, may also be displayed. See block 106. For example, a particular contact may be selected by a user, and the identifiers pertaining to that contact may be displayed, as previously described. Similarly, the messages received from or sent to a particular contact may be displayed.

Figure 12:
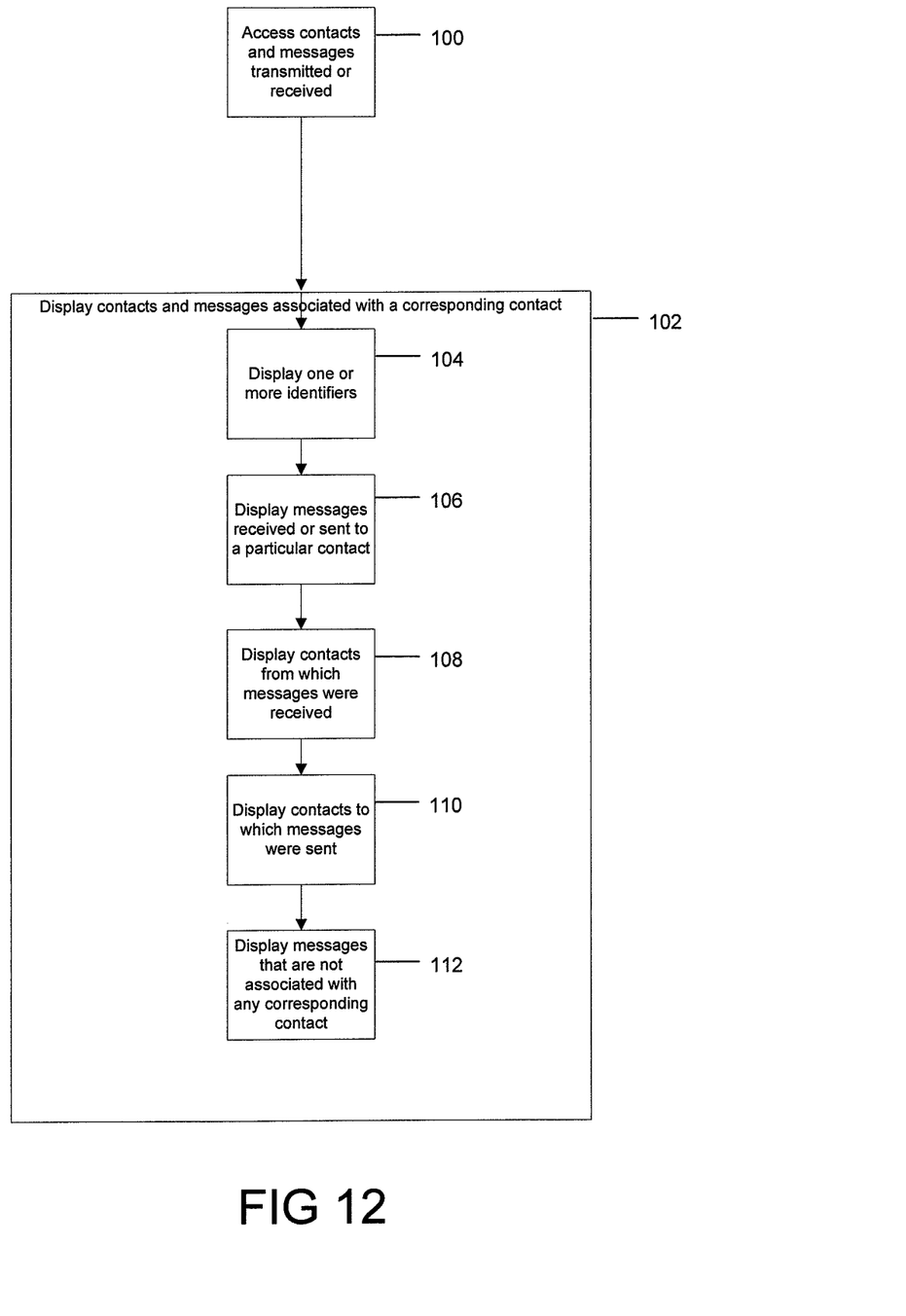
FIG. 12 illustrates a flowchart according to an exemplary method for displaying messages associated with corresponding contacts according to one embodiment of the present invention.

In other embodiments, a method for displaying messages and contacts is provided. Referring to FIG. 12, a plurality of contacts and messages that have been transmitted or received by a mobile terminal are accessed. A representation of the contacts and messages are then displayed, with at least some of the messages displayed in association with a corresponding contact. See FIG. 12, blocks 100-102.

The contacts and associated messages may be displayed in a variety of ways and according to a variety of user inputs. For example, each contact may include one or more identifiers, and the identifiers of a particular contact may be displayed. See block 104. For instance, a user may select a certain contact to view the various identifiers of the contact. In addition, selection of a contact may result in the display of the messages received from or sent to the selected contact. See block 106. For example, the selection by a user of the contact entry for Person A may allow the user to view the messages received from Person A and the messages sent to Person A.

Furthermore, the contacts from which messages were received over a predefined time period may also be displayed, as shown in block 108. The predefined time period may be, for example, one week, such that any message received during the previous week would be displayed. However, the time period may be defined in terms of the number of contacts that may be displayed. For example, a limit of twenty contacts may be imposed, such that the predefined time period corresponds to the amount of time elapsed from the time the oldest of the twenty contacts was displayed to the present time. Likewise, the contacts to which messages were sent may be displayed. See block 110.

Messages that are not associated with any corresponding contact may also be displayed, for example under a contact entry or tab designated as a general inbox. See block 112. For example, a message received from a sender who is unfamiliar to the user or otherwise has no corresponding contact information stored on the receiving mobile terminal may not be associated with any corresponding contact and may be displayed with other unassociated messages.

Exemplary embodiments of the present invention have been described above with reference to block diagrams and flowchart illustrations of methods, apparatuses, and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus, such as the processing element 17 (shown in FIG. 1), to function in a particular manner, such that the instructions stored in the computer-readable memory produce an article of manufacture including computer-readable instructions for implementing the function specified in the flowchart block or blocks illustrated in FIGS. 11 and 12. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one memory storing computer program code, wherein the at least one memory and stored computer program code are configured to, with the at least one processor, cause the apparatus to at least:
   direct storage of a plurality of contacts and messages received or transmitted by the apparatus, wherein the contacts are storable independently from receipt or transmission of the messages; and
   associate at least some of the messages with a particular contact from whom the message was received or to whom the message was transmitted, wherein the particular contact was previously stored, wherein each contact includes at least one identifier selected from the group consisting of a first name, a last name, a home phone number, a work phone number, a fax number, or an e-mail address, and wherein the processor is configured to associate a message and a contact if both the message and the contact share a common identifier,
   wherein selection of the corresponding contact causes the apparatus to cause display of a single user interface that provides access to a list of the stored messages received by the apparatus from the selected contact and access to the selected contact, and
   wherein the single interface includes a first information accessor and a second information accessor, the first and second information accessors being user interface elements through which information is accessible, wherein selection of the first information accessor provides access to a list of the stored messages received by the apparatus from the selected contact and selection of the second information accessor provides access to at least one identifier relating to the selected contact.

2. The apparatus of claim 1, further comprising a display, wherein the processor is responsive to a user input selecting one of the contacts, and wherein the processor is configured to cause an image to be generated on the display that visually represents the at least one identifier of the contact selected.

3. The apparatus of claim 1, wherein the processor is configured to associate messages transmitted to a plurality of recipients with each contact that includes an identifier that corresponds to any of the recipients.

4. The apparatus of claim 1, wherein the processor is configured to associate messages that are not associated with a corresponding contact with other messages that are not associated with any corresponding contact.

5. The apparatus of claim 1, wherein the selection of at least one of the first information accessor or the second information accessor allows a user to establish communication with the selected contact.

6. A method comprising:
   directing storage of a plurality of contacts and messages received or transmitted by the apparatus, wherein the contacts are storable independently from receipt or transmission of the messages; and
   associating, via a processor, at least some of the messages with a particular contact from whom the message was received or to whom the message was transmitted, wherein the particular contact was previously stored, wherein each contact includes at least one identifier selected from the group consisting of a first name, a last name, a home phone number, a work phone number, a fax number, or an e-mail address, and wherein a message and a contact are associated if both the message and the contact share a common identifier,
   wherein selection of the corresponding contact causes the apparatus to cause display of a single user interface that provides access to a list of the stored messages received by the apparatus from the selected contact and access to the selected contact, and
   wherein the single interface includes a first information accessor and a second information accessor, the first and second information accessors being user interface elements through which information is accessible, wherein selection of the first information accessor provides access to a list of the stored messages received by the apparatus from the selected contact and selection of the second information accessor provides access to at least one identifier relating to the selected contact.

7. The method of claim 6, further comprising directing storage of the at least one identifier of each contact.

8. The method of claim 6 further comprising causing display of an image that visually represents at least one of the identifiers or the messages associated with each contact.

9. The method of claim 6, wherein associating at least some of the messages comprises associating messages transmitted to a plurality of recipients with each contact that includes an identifier that corresponds to any of the recipients.

10. The method of claim 6, wherein selection of at least one of the first information accessor or the second information accessor allows a user to establish communication with the selected contact.

11. The method of claim 6, wherein associating the messages with the particular contacts comprises associating messages that are not associated with a corresponding contact with other messages that are not associated with any corresponding contact.

12. A computer program product comprising at least one non-transitory computer-readable storage medium having computer-executable program code portions stored therein, the computer-executable program code portions comprising program code instructions for:

directing storage of a plurality of contacts and messages received or transmitted by the apparatus, wherein the contacts are storable independently from receipt or transmission of the messages; and associating at least some of the messages with a particular contact from whom the message was received or to whom the message was transmitted, wherein the particular contact was previously stored, wherein each contact includes at least one identifier selected from the group consisting of a first name, a last name, a home phone number, a work phone number, a fax number, or an e-mail address, and wherein a message and a contact are associated if both the message and the contact share a common identifier, wherein selection of the corresponding contact causes the apparatus to cause display of a single user interface that provides access to a list of the stored messages received by the apparatus from the selected contact and access to the selected contact, and wherein the single interface includes a first information accessor and a second information accessor, the first and second information accessors being user interface elements through which information is accessible, wherein selection of the first information accessor provides access to a list of the stored messages received by the apparatus from the selected contact and selection of the second information accessor provides access to at least one identifier relating to the selected contact.

13. The computer program product of claim 12, further comprising computer program portions configured for directing storage of the at least one identifier of each contact.

14. The computer program product of claim 12, wherein the program code portions are further configured for associating messages transmitted to a plurality of recipients with each contact that includes an identifier that corresponds to any of the recipients.

15. The computer program product of claim 12, wherein selection of at least one of the first information accessor or the second information accessor allows a user to establish communication with the selected contact.

16. The computer program product of claim 12, wherein the computer-executable program code portions comprising program code instructions for causing display of an image that visually represents at least one of the identifiers or the messages associated with each contact.

\* \* \* \* \*